(12) United States Patent
Bayer

(10) Patent No.: US 8,968,639 B2
(45) Date of Patent: Mar. 3, 2015

(54) COMPOSITION FOR EXTRUSION-MOLDED BODIES

(75) Inventor: Roland Bayer, Walsrode (DE)

(73) Assignee: Dow Global Technologies LLC, Midland, MI (US)

( * ) Notice: Subject to any disclaimer, the term of this patent is extended or adjusted under 35 U.S.C. 154(b) by 988 days.

(21) Appl. No.: 13/089,982

(22) Filed: Apr. 19, 2011

(65) Prior Publication Data

US 2011/0262690 A1  Oct. 27, 2011

Related U.S. Application Data

(60) Provisional application No. 61/328,014, filed on Apr. 26, 2010.

(51) Int. Cl.
| | |
|---|---|
| *C04B 35/636* | (2006.01) |
| *B29C 47/00* | (2006.01) |
| *C04B 35/195* | (2006.01) |
| *C04B 35/626* | (2006.01) |
| *C04B 38/00* | (2006.01) |
| *B01D 39/20* | (2006.01) |
| *B28B 3/20* | (2006.01) |
| *B29K 1/00* | (2006.01) |
| *B29K 709/00* | (2006.01) |
| *B29K 709/02* | (2006.01) |
| *B29L 31/14* | (2006.01) |
| *B29L 31/60* | (2006.01) |
| *C04B 111/00* | (2006.01) |

(52) U.S. Cl.
CPC ......... *C04B 35/6365* (2013.01); *B29C 47/0004* (2013.01); *C04B 35/195* (2013.01); *C04B 35/6263* (2013.01); *C04B 38/0006* (2013.01); *B01D 39/2079* (2013.01); *B28B 3/20* (2013.01); *B29C 47/0021* (2013.01); *B29K 2001/00* (2013.01); *B29K 2709/00* (2013.01); *B29K 2709/02* (2013.01); *B29L 2031/14* (2013.01); *B29L 2031/608* (2013.01); *C04B 2111/00793* (2013.01); *C04B 2111/0081* (2013.01); *C04B 2235/6021* (2013.01); *B01D 2239/086* (2013.01)
USPC ........................................................ 264/638

(58) Field of Classification Search
CPC ...................................................... C04B 16/02
See application file for complete search history.

(56) References Cited

U.S. PATENT DOCUMENTS

| | | | | |
|---|---|---|---|---|
| 3,124,474 | A * | 3/1964 | Beaver et al. | 106/193.1 |
| 4,551,295 | A | 11/1985 | Gardner et al. | |
| 4,614,545 | A | 9/1986 | Hess | |
| 5,166,333 | A | 11/1992 | Breckwoldt | |
| 5,344,799 | A | 9/1994 | Wu | |
| 5,568,652 | A | 10/1996 | Wu | |
| 6,299,678 | B1 | 10/2001 | Beall et al. | |
| 6,589,627 | B1 | 7/2003 | Nakanishi et al. | |
| 6,878,337 | B2 | 4/2005 | Noguchi et al. | |
| 7,491,755 | B2 | 2/2009 | Bayer et al. | |
| 7,497,982 | B2 | 3/2009 | Chou | |
| 2002/0185786 | A1 | 12/2002 | Makino et al. | |
| 2003/0065165 | A1 | 4/2003 | Dannhorn et al. | |
| 2005/0241539 | A1 * | 11/2005 | Hagen et al. | 106/805 |
| 2005/0241540 | A1 * | 11/2005 | Hohn et al. | 106/805 |
| 2005/0241541 | A1 * | 11/2005 | Hohn et al. | 106/805 |
| 2005/0241542 | A1 * | 11/2005 | Hagen et al. | 106/805 |
| 2005/0241543 | A1 * | 11/2005 | Hagen et al. | 106/805 |
| 2008/0262216 | A1 | 10/2008 | Hayakawa et al. | |
| 2009/0140452 | A1 | 6/2009 | DeRosa et al. | |
| 2010/0025897 | A1 | 2/2010 | Niinobe et al. | |
| 2010/0029462 | A1 | 2/2010 | DeRosa et al. | |
| 2011/0071023 | A1 | 3/2011 | Bayer | |
| 2011/0113989 | A1 | 5/2011 | Brackhagen et al. | |
| 2013/0178539 | A1 * | 7/2013 | Bakeev et al. | 514/781 |

FOREIGN PATENT DOCUMENTS

| | | |
|---|---|---|
| DE | 1222030 | 8/1966 |
| EP | 0488060 | 6/1992 |
| JP | 04209747 | 7/1992 |

OTHER PUBLICATIONS

"METHOCEL Cellulose Ethers Binders and Processing Aids for Ceramincs";1996;The Dow Chemical Company.

* cited by examiner

*Primary Examiner* — Joseph S Del Sole
*Assistant Examiner* — Russell Kemmerle, III

(57) ABSTRACT

A composition for extrusion-molded bodies which comprises
a) an inorganic material that sets as a result of baking or sintering, and
b) a methylhydroxypropyl cellulose having a DS(methyl) of from 0.8 to 2.5 and an MS(hydroxypropyl) of from 0.50 to 1.20 is useful for producing extrusion-molded bodies for use as a carrier for a catalyst, a catalyst, a heat exchanger, or a filter.

6 Claims, No Drawings

COMPOSITION FOR EXTRUSION-MOLDED BODIES

CROSS-REFERENCE TO RELATED APPLICATION

This application claims benefit of priority from U.S. Provisional Patent Application No. 61/328,014, filed Mar. 26, 2010, which application is incorporated by reference herein in its entirety.

FIELD

This invention relates to a composition for extrusion-molded bodies and a method for producing them.

BACKGROUND

Extrusion molding of inorganic masses, such as ceramic-forming materials has been performed by passing a green body or composition, which is obtained by mixing and kneading molding aids such as organic binders, surfactants, lubricants, and plasticizers with inorganic materials, particularly ceramic-forming materials, through dies having a desired shape into a sheet, a bar, a hollow tube, a rectangular column, a hollow rectangular column, or a honeycomb structure. In particular, the extrusion-molded body in the form of ceramic honeycombs has been in use as a carrier for exhaust gas cleaning catalysts, filters, and heat exchangers in the fields of automobiles and various industries.

U.S. Pat. No. 4,551,295 relates to the extrusion of a plastic ceramic batch into articles of widely-differing profiles and shapes such as, for example, dinnerware and electrical insulators, and especially the extrusion of thin-walled honeycomb structures from ceramic batches capable of flowing or plastically deforming under pressure during extrusion. The U.S. patent discusses that a methyl cellulose, such as METHOCEL™ A4M cellulose ether having a viscosity of 4000 mPa·s, measured as a 2 wt. % aqueous solution at 20° C. according to Ubbelohde has a low gelation temperature. According to FIG. 8 of the U.S. patent a sharp rise in extrusion pressure is observed when increasing the extrusion temperature in the range of 23-30° C. The U.S. patent discusses that such rise in extrusion pressure is not observed when using as a binder/plasticizer METHOCEL™ F4M cellulose ether which is commercially available from The Dow Chemical Company and has a viscosity of 4000 mPa·s. METHOCEL™ F4M cellulose ether has a methoxyl substitution of 27-30 weight percent and a hydroxypropoxyl substitution of 4.0-7.5 weight percent. The U.S. patent suggests using a hydroxypropyl cellulose having a viscosity of 25,000-100,000 mPa·s, measured as a 2 wt. % aqueous solution at 20° C. according to Ubbelohde to permit the use of working temperatures greater than 35° C. in a twin screw extrusion apparatus.

Japanese Patent publication JP4209747A discloses the use of methylhydroxypropyl cellulose in a ceramic extrusion process having a degree of substitution of methyl groups from 19-24% and hydroxypropyl groups from 10-16% and a aqueous viscosity, measured as 2% aqueous solution, from 65.000-120.000 cPs (mPa·s).

European patent application EP 2 157 064 A2 discloses that cellulose ethers are used in compositions for ceramic extrusion-molded bodies as an organic binder because of their excellent plasticity, water retention and thermal gelation characteristics. EP 2 157 064 A2 discusses that these cellulose ethers are disadvantageous in that they increase in frictional force with the die portion during extrusion molding and thus, the extrusion temperature rises owing to this frictional resistance. EP 2 157 064 A2 suggests solving this problem by additionally incorporating a styrenesulfonate in ceramic compositions comprising a ceramic material and a water-soluble cellulose ether for extrusion molding to enable extrusion molding at high temperatures and thus increasing the extrusion molding speed.

The International patent application WO2007/047103 relates to the use of an organic binder system which comprises an organic lubricant, such as a monocarboxylic acid like stearic acid, grafted to a cellulose ether binder, such as methylcellulose or hydroxypropyl methylcellulose like Methocel™ A4M and 20-333 and Methocel™ F240 available from The Dow Chemical Company.

Unfortunately, the use of styrenesulfonate or of cellulose ether binders to which a monocarboxylic acid has been grafted significantly increases the costs of compositions for extrusion-molded bodies.

Accordingly, it would be desirable to provide new compositions for extrusion-molded bodies which can be extruded at a reasonably low extrusion pressure. Technical and economic disadvantages of high extrusion pressures make operation of the extruders prematurely uneconomical due to high wear or high power costs.

SUMMARY OF INVENTION

One aspect of the present invention is a composition for extrusion-molded bodies which comprises a) an inorganic material that sets as a result of baking or sintering, and b) a methylhydroxypropyl cellulose having a DS(methyl) of from 0.8 to 2.5 and an MS(hydroxypropyl) of from 0.50 to 1.20.

Another aspect of the present invention is the use of the above-mentioned methylhydroxypropyl cellulose for reducing the pressure in an extrusion-molding process for manufacturing an extrusion-molded body.

Yet another aspect of the present invention is a method for manufacturing an extrusion-molded body which comprises the steps of mixing an inorganic material, the above-mentioned methylhydroxypropyl cellulose, water and optional additives to provide an extrudable mass and subjecting the extrudable mass to extrusion molding, drying and sintering.

Yet another aspect of the present invention is an extrusion-molded body produced from the above-mentioned composition.

Yet another aspect of the present invention is the use of the above-mentioned extrusion-molded body as a carrier for a catalyst, as a catalyst, a heat exchanger, or a filter.

DESCRIPTION OF EMBODIMENTS

It has been surprisingly found that compositions which are used for extrusion-molded bodies can be extruded at a lower extrusion pressure when they comprise a methylhydroxypropyl cellulose having a DS(methyl) of from 0.8 to 2.5 and an MS(hydroxypropyl) of from 0.50 to 1.20 instead of methylcelluloses or methylhydroxypropyl celluloses which have been previously used in compositions for extrusion-molded bodies. The degree of the methyl substitution, DS (methyl), of a cellulose ether is the average number of substituted OH groups per anhydroglucose unit (AGU). The degree of the hydroxypropyl substitution is described by the MS (molar substitution). The MS (hydroxypropyl) or MS (HP) is the average number of moles of the etherification reagent propylene oxide which are bound by an ether bond per mole of anhydroglucose unit. The determination of the DS (methyl) and MS (hydroxypropyl) is carried out according to ASTM D3876-96 (Reapproved 2001). According to this method the methoxyl and hydroxypropyl substitution content is obtained in percent (%), from which the DS(methyl) and the MS (hydroxypropyl) can be calculated, as known by the skilled artisans.

Preferably the methylhydroxypropyl cellulose has a DS(methyl) of at least 1.0, more preferably at least 1.2, and most preferably at least 1.4; and preferably up to 2.3, more preferably up to 2.1, and most preferably up to 1.9. Preferably the methylhydroxypropyl cellulose has a MS(hydroxypropyl) of from 0.50 to 1.10. Preferably the sum of the DS(methyl) and the MS(hydroxypropyl) is at least 2.20, more preferably at least 2.40, most preferably at least 2.60. Preferably the sum of the DS(methyl) and the MS(hydroxypropyl) is up to 3.20, more preferably up to 3.00, most preferably up to 2.8.

The viscosity of the methylhydroxypropyl cellulose generally is from 300 to 200,000 mPa·s, more preferably from 400 to 100,000 mPa·s, determined in a 2% by weight aqueous solution at 20° C. in a Haake VT550 Viscotester at 20° C. and at a shear rate of 2.55 $s^{-1}$.

The composition for extrusion-molded bodies is a mass which sets as a result of baking or sintering, most preferably a ceramic-forming material. Masses which set as a result of baking or sintering do not include hydraulic binders such as cement or gypsum and do not include masses based on cement or gypsum.

The inorganic ceramic-forming materials can be synthetically produced materials such as oxides, hydroxides, etc., or they can be naturally occurring minerals such as clays, talcs, or any combination of these. More preferably, the inorganic materials are alumina or a precursor thereof, silica or a precursor thereof, an aluminate, aluminosilicate, alumina silica, feldspar, titania, fused silica, aluminum nitride, aluminum carbide, kaolin, cordierite or a precursor thereof, mullite or a precursor thereof, clay, bentonite, talc, zircon, zirconia, spinel, silicon carbide, silicon boride, silicon nitride, titanium dioxide, titanium carbide, boron carbide, boron oxide, borosilicate, soda barium borosilicate, silicates and sheet silicates, a silicon metal, carbon, ground glass, a rare earth oxide, soda lime, zeolite, barium titanate, lead titanate zirconate, aluminium titanate, barium ferrite, strontium ferrite, carbon, ground glass, metal oxides, such a rare earth oxides, or a combination of two or more of such inorganic materials. The term "clay" means a hydrated aluminum silicate having a platy structure and forms plastic masses when mixed with water. Typically, clays are comprised of one or more crystalline structures such as kaolins, illites and smectites. Preferred oxides are those that form cordierite or mullite when mixed with clay (e.g., silica and talc for forming cordierite and alumina when forming mullite).

The composition for extrusion-molded bodies preferably comprises from 85 to 99.5 percent, more preferably from 90 to 99.3 percent, most preferably from 92 to 99 percent of the inorganic material a) and from 0.5 to 15 percent, more preferably from 0.7 to 10 percent, most preferably from 1 to 8 percent of the methylhydroxypropyl cellulose b), based on the total weight of the inorganic material a) and the methylhydroxypropyl cellulose b).

The composition of the present invention preferably is in the form of a paste. Generally it comprises a diluent which is liquid at 25° C. and provides a medium for the methylhydroxypropyl cellulose to dissolve in thus providing plasticity to the batch and wetting of the powders. The liquid diluent can be aqueous based, which are normally water or water-miscible solvents; or organically based or a mixture thereof. Most preferably water is used. The composition for extrusion-molded bodies preferably comprises from 10 to 60 weight parts, more preferably from 20 to 50 weight parts, most preferably from 15 to 40 weight parts of the liquid diluent per 100 weight parts of the inorganic material a).

The composition of the present invention may further comprise other additives such as surfactants, lubricants and pore-forming materials.

Non-limiting examples of surfactants that can be used in the practice of the present invention are $C_8$ to $C_{22}$ fatty acids and/or their derivatives. Additional surfactant components that can be used with these fatty acids are $C_8$ to $C_{22}$ fatty esters, $C_8$ to $C_{22}$ fatty alcohols, and combinations of these. Exemplary surfactants are stearic, lauric, oleic, linoleic, palmitoleic acids, and their derivatives, stearic acid in combination with ammonium lauryl sulfate, and combinations of all of these. Most preferred surfactants are lauric acid, stearic acid, oleic acid, and combinations of these. The amount of surfactants typically may be from 0.5 to 3 percent, based on the weight of the inorganic material a).

Non-limiting examples of lubricants are for example polyethylene oxide homopolymers, copolymers and terpolymers, glycols, or oil lubricants, such as light mineral oil, corn oil, high molecular weight polybutenes, polyol esters, a blend of light mineral oil and wax emulsion, a blend of paraffin wax in corn oil, and combinations of these. Typically, the amount of oil lubricants may be from 0.1 to 10 percent, more typically from 0.3 to 6 percent, based on the weight of the inorganic material a).

In filter applications, such as in diesel particulate filters, it is customary to include a burnout pore-forming material in the mixture in an amount effective to subsequently obtain the porosity required for efficient filtering. A burnout pore-forming material is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are polyacrylates, polymethacrylates, graphite, carbon black, cellulose or flour. Elemental particulate carbon is preferred. Graphite is especially preferred. Other useful pore-forming materials are fibers, such as fibers based on cellulose, bamboo, coconut, polyethylene, polypropylene, polyamide, polyacrylonitrile, carbon, glass, ceramic and other mineral fibers. Typically, the amount of pore-forming materials may be from 5 to 60 percent, more typically from 10 to 50 percent, based on the total weight of the inorganic material a).

Uniform mixing of the inorganic material a), the methylhydroxypropyl cellulose b), typically a liquid diluent and optionally other additives such as surfactants, lubricants and pore-forming materials can be accomplished by, for example, a known conventional kneading process. The resulting extrudable composition for extrusion-molded bodies is usually stiff and uniform. It can then be shaped into a green body by any known conventional ceramic extrusion process. In an exemplary aspect, extrusion can be done using a hydraulic ram extrusion press, or a two stage de-airing single auger extruder, or a twin screw extruder with a die assembly attached to the discharge end. The prepared green body can then be dried to remove excess moisture. The drying can be performed by hot air, or steam or dielectric drying, which can be followed by air drying. Once dried, the green body can thereafter be fired under conditions effective to convert the green body into a sintered article according to known techniques. The firing conditions of temperature and time depend on the composition and size and geometry of the body, and the invention is not limited to specific firing temperatures and times. Typical temperatures are from 600° C. to 2300° C., and the holding times at these temperatures are typically from 1 hour to 20 hours.

The extrusion-molded bodies according to the present invention can have any convenient size and shape. They find use in a number of applications such as carriers for catalysts, as catalysts, heat exchangers, or filters, for example as diesel particulate filters, molten metal filters and regenerator cores. In a preferred aspect, the composition and the method of the present invention is well suited for the production of cellular bodies such as honeycombs. These cellular ceramic bodies are particularly useful as carriers for catalysts or as catalyst filters for exhaust gas treatment.

Generally honeycomb densities range from about 15 cells/cm$^2$ to about 235 cells/cm$^2$. Typical wall thicknesses are from 0.05 to 0.65 mm. It should however be understood that the particular desired size and shape of the ceramic body can depend on the application, e.g., in automotive applications by engine size and space available for mounting. Although the extrusion-molded bodies of the instant invention are, in one aspect, suitable for preparing thin-walled honeycombs, the claimed mixtures can also be used for thicker walled structures. For example, honeycombs structures having 15 to 30 cells/cm$^2$ and 0.30 to 0.64 mm wall thicknesses are well suited for diesel particulate filter applications.

The methylhydroxypropyl cellulose described herein is useful for reducing the pressure in extrusion-molding processes which are used for manufacturing extrusion-molded bodies. It has been surprisingly found that compositions which are used for extrusion-molded bodies can be extruded at a lower extrusion pressure when they comprise the above described methylhydroxypropyl cellulose than when the extrusion-molded bodies comprise a methylcellulose or methylhydroxypropyl cellulose which has been used according to the prior art in such compositions.

The present invention is further illustrated by the following examples which are not to be construed to limit the scope of the invention. Unless otherwise mentioned, all parts and percentages are by weight.

Examples 1 to 5 and Comparative Examples A to F 100 parts by weight of a cordierite formulation consisting of cordierite CP 820M (Imerys Tableware, Germany) and 2 parts by weight (based on 100 parts by weight of cordierite formulation) of a cellulose ether listed in Table 1 below were firstly mixed dry in a fluidized-bed mixer (manufactured by Lödige, Germany) until a homogeneous mixture was formed. 30.5 parts of water at 20° C. (based on 100 parts by weight of cordierite) were subsequently added; the mass was mixed further and kneaded in a kneader (manufactured by AMK, Aachen, Germany) for a few minutes. The mass was then immediately introduced into the feed trough of a water-cooled, single-screw extruder (Händle PZVE 8D, screw diameter 8 cm, from Händle, Mühlacker, Germany). The mass was extruded through a perforated plate and passed through a vacuum chamber for degassing. It was strained (i.e. pressed through a screen having a mesh size of 0.3 mm in order to free the mass of aggregates) for 30 minutes. Then the paste was extruded at room temperature for a few minutes with material recirculation until the pressure reached a constant value. Then the paste was extruded with a screw speed of 15 rpm. through an honeycomb profile of a cell density of 47 cells/cm$^2$ (300 cells per square inch) and discharged onto a conveyor belt.

The resulting extrusion pressure listed in Table 1 is the pressure measured just before passage of the mass through the die. It was measured in bar.

The resulting temperatures of the extruded profile were measured and were all 30° C.

TABLE 1

| Comp. Example | Cellulose ether type | Measured DS/MS | Calculated Methoxyl/hydroxypropoxyl (%)/(%) | Viscosity (mPas) | Temperature during extrusion (° C.) | Resulting extrusion pressure (bar/[MPa]) |
|---|---|---|---|---|---|---|
| 1 | HPMC* | 1.67/1.01 | 21.2%/31.1% | 4600 | 30 | 24/[2.4] |
| 2 | HPMC | 1.83/0.58 | 25.6%/19.7% | 4600 | 30 | 25/[2.5] |
| 3 | HPMC | 1.81/0.87 | 23.6%/27.4% | 4200 | 30 | 23/[2.3] |
| 4 | HPMC | 1.43/1.02 | 18.4%/31.7% | 4400 | 30 | 26/[2.6] |
| 5 | HPMC | 1.66/0.57 | 23.6%/19.6% | 4900 | 30 | 27/[2.7] |
| A | MC** | 1.61/0 | 27.1%/0 | 4400 | 30 | 35/[3.5] |
| B | MC | 1.78/0 (Methocel ™ A4M) | 29.5%/0 | 6800 | 30 | 33/[3.3] |
| C | HPMC | 1.39/0.14 | 22.7%/5.5% | 6400 | 30 | 40/[4.0] |
| D | HPMC | 1.44/0.31 | 22.3%/11.6% | 5900 | 30 | 34/[3.4] |
| E | HPMC | 1.63/0.09 | 26.6%/3.6% | 6900 | 30 | 33/[3.3] |
| F | HPMC | 1.86/0.19 | 28.9%/7.2% | 5500 | 30 | 29/[2.9] |

*HPMC: methylhydroxypropyl cellulose
**MC: methylcellulose

The results in Table 1 illustrate that the composition of the present invention which comprises a methylhydroxypropyl cellulose being substituted with methyl and hydroxypropyl groups as claimed herein can be extruded at a significantly lower extrusion pressure than compositions that comprise a methylcellulose or methylhydroxypropyl cellulose with another DS(methyl) and MS(hydroxypropyl).

What is claimed is:

1. A method for manufacturing an extrusion-molded body, comprising the steps of mixing
    a) an inorganic material that sets as a result of baking or sintering,
    b) a methylhydroxypropyl cellulose having a DS(methyl) of from 0.8 to 2.5 and an MS(hydroxypropyl) of from 0.50 to 1.20,
        water and optionally additives selected from surfactants, lubricants and pore-forming materials to provide an extrudable mass and subjecting the extrudable mass to extrusion molding, drying and sintering.

2. The method of claim 1 wherein the methylhydroxypropyl cellulose has a DS(methyl) of from 1.4 to 1.9, the methylhydroxypropyl cellulose has a MS(hydroxypropyl) of from 0.50 to 1.10, and the sum of the DS(methyl) and the MS(hydroxypropyl) of the methylhydroxypropyl cellulose is at least 2.40.

3. The method of claim 1 wherein the methylhydroxypropyl cellulose has a DS(methyl) of from 1.0 to 2.3.

4. The method of claim 1 wherein the sum of the DS(methyl) and the MS(hydroxypropyl) of the methylhydroxypropyl cellulose is at least 2.20 and up to 3.00.

5. The method of claim 1 wherein the inorganic material is a ceramic-forming material.

6. The method of claim 1 wherein the inorganic material is an alumina or a precursor thereof, silica or a precursor thereof, an aluminate, aluminosilicate, alumina silica, feldspar, titania, fused silica, aluminum nitride, aluminum carbide, kaolin, cordierite, mullite, clay, bentonite, talc, zircon, zirconia, spinel, silicon carbide, silicon boride, silicon nitride, titanium dioxide, titanium carbide, boron carbide, boron oxide, borosilicate, soda barium borosilicate, a silicate, a sheet silicate, a silicon metal, carbon, ground glass, a rare earth oxide, soda lime, zeolite, barium titanate, lead titanate zirconate, aluminium titanate, barium ferrite, strontium ferrite, carbon, ground glass, a rare earth oxide, or a combination of two or more of such inorganic materials.

\* \* \* \* \*